(No Model.)
T. L. WILLSON.
APPARATUS FOR GENERATING GAS.
No. 552,028. Patented Dec. 24, 1895.
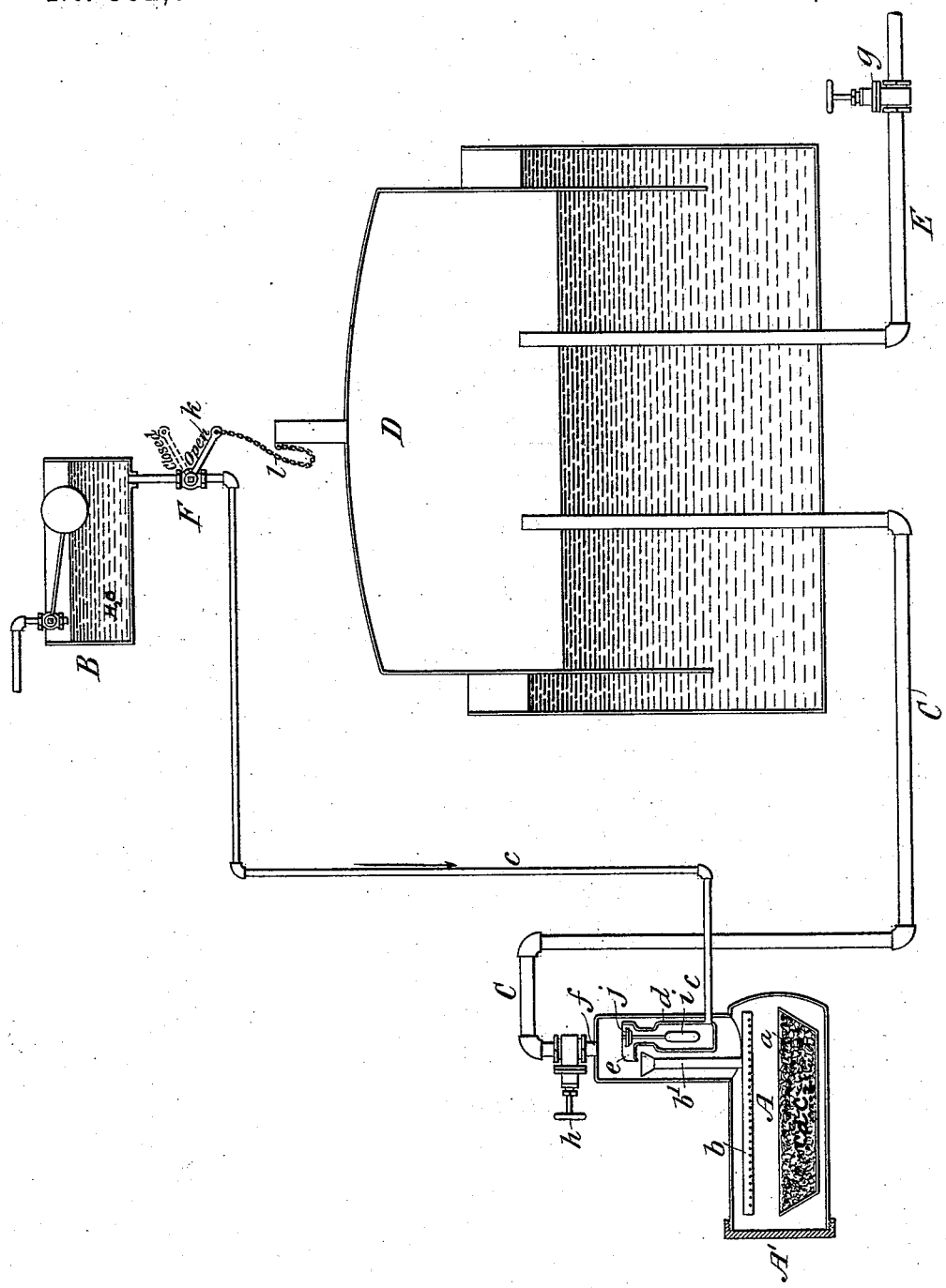
WITNESSES:
C. E. Ashley
Fred White
INVENTOR:
Thomas L. Willson,
By his Attorneys,
Arthur O. Graser & Co.

UNITED STATES PATENT OFFICE.

THOMAS L. WILLSON, OF NEW YORK, N. Y., ASSIGNOR TO THE ELECTRO GAS COMPANY, OF WEST VIRGINIA.

APPARATUS FOR GENERATING GAS.

SPECIFICATION forming part of Letters Patent No. 552,028, dated December 24, 1895.

Application filed September 26, 1894. Serial No. 524,153. (No model.)

*To all whom it may concern:*

Be it known that I, THOMAS L. WILLSON, a citizen of the United States, residing in the city, county, and State of New York, have invented certain new and useful Improvements in Apparatus for Generating Gas, of which the following is a specification.

This invention relates to the generation of gas for illuminating, heating, or other purposes by the reaction of water upon calcium carbide or any other chemical substances having an affinity for water and capable of reacting with water to generate a hydrocarbon or other combustible gas.

The present invention provides an improved apparatus for the generation of such gas, the object of the invention being to control automatically the generation of the gas, in order that however the demand for the gas may vary the operator shall cause the gas to be generated with equal variation.

The invention consists in the combination of the following apparatus—namely, a reaction-chamber in which the calcium carbide or other chemical may be placed, having an outlet for the generated gas and an inlet for water and an automatic governor for controlling the flow of water through said inlet, said governor constructed to be operated by variations in the pressure of the generated gas either in the reaction-chamber itself or in any suitable gas holder or reservoir which may be provided for containing the gas.

The figure of the accompanying drawing illustrates one embodiment of my invention, the view being an elevation mainly in vertical mid-section.

Referring to the figure, let A designate a "reaction-chamber," so called, consisting preferably of a steel cylinder or other vessel of sufficient strength, and having a removable head or cover A' fastened to it in any suitable way, (being shown as screwing on, for example,) so that by removing this head a tray *a* containing the carbide of calcium or other chemical may be removed to discharge the spent carbide and replaced to fill with fresh carbide. Within the reaction-chamber is a sprinkler *b*, consisting of a perforated tube or a nozzle of any construction adapted to discharge water upon the carbide in the form of a spray or shower. The water to supply this sprinkler enters through a water-inlet *c*, consisting of a pipe leading from an elevated water-tank B or other suitable source of water. In the construction shown the pipe *c* on entering the chamber A extends upwardly in the form of an enlarged tube or vessel *d*, from which the water overflows by a spout *e* into the funnel-shaped top of a tube *b'* leading down to the sprinkler *b*. These parts are preferably arranged in an upward extension or dome forming part of the chamber A. This chamber is formed with a gas-outlet *f* extending preferably from the top of this dome in order to deliver the gas as free as possible from moisture. From this outlet the gas is conducted by a pipe C into a gas-holder or gasometer D. This gas-holder (which is not shown in detail in the drawing) may be of any construction such as commonly used in connection with gas-works, consisting of a counterweighted bell, floating or sealed in liquid, and capable of rising and falling according to the varying amount of gases thus stored. The gas is discharged from it through a pipe E. The discharge of gas may be shut off by a valve *g* in the latter pipe, and the communication between the reaction-chamber A and the pipe C may be shut off by a valve *h*.

On admitting water through the sprinkler *b* upon the carbide a reaction at once takes place whereby acetylene gas is generated in large quantities. This gas passes out through the pipe C into the gas-holder D, which latter is displaced or raised by the entering gas. The generation of gas is in proportion to the amount of water introduced to the carbide until all of the carbide has been reduced. Accordingly, if the shower of water were continued and the consumption of gas through the pipe E were to occur, as it usually will, at a less rate than the rate of generation of the gas, the latter will accumulate to such extent as to lift the gas-holder D to its highest position. Before this point is reached, however, the generation of gas should be stopped, and to do this the inflow of water is arrested.

My invention provides automatic means for regulating the inflow of water in proportion to the amount of gas required to be generated, or, in other words, according to the accumulation or pressure of the gas. The simplest means for doing this is by the apparatus as thus far described. The open-topped tube or stand-pipe $d$, from which the entering water overflows, being arranged within the reaction-chamber, receives upon the surface of the column of water the downward pressure of the generated gas. As long as this pressure is less than the hydrostatic pressure due to the head upon the column of water, the water will continue to enter and overflow from the stand-pipe into the pipe $b'$; but as soon as the pressure of gas becomes sufficient to balance the hydrostatic pressure the flow of water will be arrested and the column of water in the stand-pipe $d$ will be held in equilibrium, or by a further increase in the gas-pressure will be forced downward in the stand-pipe. By this simple means the regulation may be effected, the inflow of water and consequently the generation of gas being arrested whenever the gas reaches a predetermined pressure, the height of the tank B being such as to supply a hydrostatic pressure upon the column of water equaling such predetermined gas-pressure. Whenever by consumption of the gas from the holder D the gas-pressure falls below its normal pressure, the water will again flow and more gas be generated, the operation continuing thus automatically until all of the carbide in the reaction-chamber has been reduced.

In case of a rapid increase in the pressure of gas the column of water might be forced entirely out of the stand-pipe $d$ and some gas might escape through the pipe $c$. To prevent this, I have introduced a simple construction of float-valve, as shown in the figure, by suspending a float $i$ within the stand-pipe, connecting it by a suitable stem or rod with a valve $j$ adapted to seat itself within the upper end of the stand-pipe. When the water is flowing normally or its flow is arrested by a balance of the gaseous and hydrostatic pressures, the float holds the valve $j$ above its seat; but in case the gaseous pressure becomes excessive, so as to force the column of water downward in the stand-pipe when the water-level descends to the float $i$, the latter falls and drops the valve $j$ upon its seat, thereby closing the top of the stand-pipe and preventing further entrance of gas, and hence preventing the escape of gas through the pipe $c$. In such automatic apparatus it is desirable to provide for the contingency that the apparatus may get out of order or fail to work with the desired smoothness or freedom. To this end I have provided an auxiliary means for controlling the water-supply, which is preferably used in connection with the mechanism already described; but it may be used as a substitute therefor. This means consists of a valve F in the water-pipe $c$, operated through a lever $k$ by the gas-holder D. When the gas-holder rises to where it is nearly full, some portion of it, or some part connected to it, strikes the lever $k$ and moves it from the open position shown in full lines in the figure to the closed position shown in dotted lines, thereby closing the valve F and positively cutting off the flow of water. The generation of gas is thereby interrupted, and will not be resumed until the valve F is again opened. For this purpose the descent of the gas-holder as the gas is drawn from it is utilized to move the lever $k$ in the opposite direction, this being readily accomplished by means of a chain or other connection $l$ between the gas-holder and lever, so that when the gas-holder descends to its lowest position it pulls on this chain, and thereby pulls down the lever $k$ from the closed to the open position of the valve. This auxiliary mechanism is constructed and adapted to operate under more extreme conditions than the governor first described, in order that if the primary governor fails to operate within its normal range of operation, that upon a greater accumulation of gas the auxiliary valve or governor will operate and insure the stoppage of the generation of gas. Instead, however, of employing the two governors, one as a lock upon the other, it will ordinarily be sufficient to employ only one, and if preferred the construction last described—namely, the valve F and its connections with the gas-holder—may be employed alone.

My invention may be applied in many other ways than those shown, it being only essential to my invention that a governor of some kind responsive to variations in the pressure of the generated gas shall act to control the admission of water into the reaction-chamber in contact with the carbide or other gas-producing chemical. Any suitable construction of reaction-chamber may be employed in lieu of that shown, and any other source of water may be provided. Any construction of valve for controlling the flow of water may be used. Any suitable construction of reservoir or gas-holder for containing or storing the generated gas may be employed, no particular construction of this or any of the parts specified being essential to my invention.

The means for storing the gas may be wholly omitted without departing from my invention, since the pressure in the gas-conduit pipe or in the reaction-chamber may be made available for controlling the flow of water.

I claim as my invention the following-defined novel features, substantially as hereinbefore specified, namely:

In a gas generating apparatus, the combination with a reaction chamber having a gas outlet and a water inlet, a gas reservoir in connection with said gas outlet for storing the generated gas under pressure, an automatic governor for controlling the flow of water through said inlet, constructed to be operated by variations in the pressure of the generated gas in said reaction chamber, and a secondary automatic governor constructed to be operated by variations in the quantity of gas contained in said reservoir.

In witness whereof I have hereunto signed my name in the presence of two subscribing witnesses.

THOMAS L. WILLSON.

Witnesses:
GEORGE H. FRASER,
THOMAS F. WALLACE.